United States Patent [19]

Mehrotra et al.

[11] Patent Number: 4,925,458

[45] Date of Patent: * May 15, 1990

[54] CUTTING TOOL

[75] Inventors: Pankaj K. Mehrotra, Greensburg; Elizabeth R. Billman, Pittsburgh, both of Pa.

[73] Assignee: Kennametal Inc., Latrobe, Pa.

[*] Notice: The portion of the term of this patent subsequent to Aug. 1, 2006 has been disclaimed.

[21] Appl. No.: 270,998

[22] Filed: Nov. 14, 1988

Related U.S. Application Data

[62] Division of Ser. No. 56,091, May 28, 1987, Pat. No. 4,852,999.

[51] Int. Cl.$^5$ ................................................ B24D 3/00
[52] U.S. Cl. .......................................... 51/293; 51/309
[58] Field of Search ................................. 51/293, 309

[56] References Cited

U.S. PATENT DOCUMENTS

| | | | |
|---|---|---|---|
| 3,580,708 | 5/1971 | Ogawa et al. | 51/307 |
| 4,543,345 | 9/1985 | Wei | 501/95 |
| 4,745,091 | 5/1988 | Landingham | 501/87 |
| 4,756,791 | 7/1988 | D'Angelo et al. | 156/610 |
| 4,789,277 | 12/1988 | Rhodes et al. | 409/131 |

FOREIGN PATENT DOCUMENTS 0202504 11/1986 European Pat. Off. .

OTHER PUBLICATIONS

"Encyclopedia of Materials Science and Engineering," vol. 7 T-2, MIT Press, (1986), pp. 5344-5346.

Faber and Evans, "Crack Deflection Processes—I. Theory," Acta Metall., vol. 31, No. 4, pp. 565-576, (1983).

A. Kato et al., "Growth Rate of Titanium Carbide Whiskers in Chemical Vapor Deposition," J. Cryst. Growth, 37, (1977), pp. 293-300.

N. Tamari et al., "Catalytic Effects of Various Metals and Refractory Oxides on the Growth of TiC Whiskers by Chemical Vapor Deposition," J. Cryst. Growth, 46, (1979), pp. 221-237.

*Primary Examiner*—Paul Lieberman
*Assistant Examiner*—Willie J. Thompson
*Attorney, Agent, or Firm*—John J. Prizzi

[57] ABSTRACT

A ceramic composition comprising a polycrystalline alumina matrix having titanium carbide whiskers distributed therein. The composition comprises 50 to 90 volume percent high purity alumina, 10 to 50 volume percent signal crystal titanium carbide whiskers, and up to 3 volume percent being the residue of sintering aids.

11 Claims, 2 Drawing Sheets

CUTTING TOOL

This application is a division of Ser. No. 07/056091, filed 5/28/87 now patent no. 4582999.

BACKGROUND OF THE INVENTION

Materials for cutting tool inserts fall into several well-known categories. These include high speed steels, cast alloys of cobalt and chromium, sintered carbides and ceramic materials such as alumina with the corundum crystal structure, and even diamonds. Each material has an advantage depending upon the particular application. Some are much more expensive than others. High speed steel has the greatest resistance to shock of all the materials. For this and other reasons, it is the preferred cutting material for many applications. Because of their resistance to wear, cast alloys and sintered carbides often cost less per piece machined than the steels.

Ceramic materials are used in especially difficult applications. They have high hardness, chemical inertness and wear resistance even at elevated temperatures. This makes them useful, for example, for cutting cast iron and hardened steel at high cutting speeds. The inertness prevents welding of the tool insert to the metal being machined at the temperatures created by machining. Generally, however, ceramic tool inserts cannot be used in heavy interrupted cuts. Also, at slower machining speeds, tool loads are markedly higher and ceramic tools are likely to chip or fracture because of their lower tensile strength and toughness.

Tougher ceramic tools have been developed. These may comprise the addition of a second ceramic phase. Each phase is comprised of equiaxed grains as a result of combining equiaxed powders prior to hot pressing to form the tool insert. The addition of a second equiaxed phase increases toughness to some extent and provides a wear resistant tool insert.

Ceramic cutting tools made of alumina-titanium carbide composites have been successful in machining ferrous and non-ferrous alloys. See, for example, U.S. Pat. No. 3,580,708. These ceramic composites possess excellent high temperature mechanical strength and chemical wear resistance which are needed for superior performance in metal cutting. The utility of the material may be limited by its low fracture toughness in applications where tools tend to fail by fracture, say, in milling or high speed roughing.

Toughness of equiaxed ceramic composites is known to increase with increasing volume of the second phase up to a maximum that depends upon the particular phases and generally reaching a maximum between 30 and 40 volume percent of the second phase. Fracture toughness of ceramic composites may be further increased by altering the morphology or shape of the second phase. It has been shown by Faber and Evans, in "Crack Deflection Processes-I. Theory," *Acta Metall.*, Vol. 31, No. 4, pp. 565–576 (1983) that the fracture toughness of certain ceramic composites can be increased by as much as four times by using rod-shaped second phases. The shape of the second phase is characterized by its aspect ratio (length to diameter ratio).

A composition disclosed in Wei U.S. Pat. No. 4,543,345 comprises the addition of silicon carbide whiskers to an alumina matrix to increase fracture toughness. It is explained in the Wei patent that the improved fracture toughness and resistance to slow crack growth is the result of energy spent in pulling whiskers out of the matrix. It is also pointed out in the Wei patent that not all matrix compositions are toughened by the addition of silicon carbide whiskers. Selected compositions disclosed in the Wei patent are finding use as materials for tool inserts. The tool inserts made with silicon carbide whiskers have limited use. They are very useful for Inconel and other superalloys but have poor service life with steel or cast iron.

SUMMARY OF THE INVENTION

It is an advantage of the herein described invention to provide a ceramic composition suitable for use in cutting tool inserts because of its increased fracture toughness and its chemical inertness.

It is a further advantage of the invention to provide a method of machining metals better than with silicon carbide containing ceramic cutting tool inserts.

Briefly, according to this invention, a ceramic composition suitable for machining metals including irons, cast irons, steels and superalloys comprises a polycrystalline alumina matrix with single crystal titanium carbide whiskers distributed therein. The useful, preferred and most preferred compositions on the basis of volume percent are set forth in the following table:

| Ingredient | Useful | Preferred | Most Preferred |
| --- | --- | --- | --- |
| high purity alumina | 50 to 90 | 65 to 85 | 65 to 75 |
| TiC whiskers | 10 to 50 | 15 to 35 | 25 to 35 |
| Residue of sintering aids | up to 3 | 0.25 to 1.5 | 0.25 to 1.5 |

The ceramic compositions described herein are all densified at elevated temperatures, for example, by uniaxial hot pressing, by hot isostatic pressing, or by pressureless sintering. With hot-pressing, the whiskers will have a discernable orientation perpendicular to the direction of pressing. A sintering procedure for obtaining a substantially random orientation of the whiskers comprises pressureless sintering or hot isostatic pressing. The conditions suitable for densifying cutting tool compositions according to this invention are set forth in the following table:

| Condition | Useful Range | Preferred Range |
| --- | --- | --- |
| Temperature | 1400 to 1900 degrees Centigrade | 1500 to 1650 degrees Centigrade |
| Pressure | 15 to 30,000 psi | 3500 to 35,000 psi |
| Time at Temperature | 5 minutes to 3 hours | about 1 hour |
| Atmosphere | argon, nitrogen, helium | argon |

The most desirable sintering conditions will vary. For example, the larger the percentage of whiskers in the composition the higher the temperature required. The size of the part and the heating method will determine the time at temperature. The larger the part, the longer the time required.

The high purity alumina matrix is preferably comprised of at least 99 weight percent $Al_2O_3$. The sintering aid preferably comprises $ZrO_2$. Other sintering aids comprise $Y_2O_3$, $MgO$ and $CaO$. The average grain size of the high purity alumina matrix is preferably 0.5 to 3 microns and the diameter of the titanium carbide whiskers preferably ranges from 0.25 to 3.0 microns and the length of the whiskers preferably ranges up to 150 microns.

The whiskers may be preferentially oriented in planes perpendicular to one axis or they may be randomly oriented in the alumina matrix.

Also, according to this invention, there is provided a method of machining metals, including iron, steels, cast iron, superalloys and other materials. The method comprises the steps of:

(a) using a cutting tool insert comprised of a ceramic composition comprising a polycrystalline alumina matrix having titanium carbide whiskers distributed therein, and (b) maintaining the machining feed rate between 0.005 and 0.030 inch per revolution and the machining speed between 500 and 4000 surface feet per minute.

The depth of cut preferably ranges up to 0.2 inch.

DESCRIPTION OF THE DRAWINGS

Further features and other objects and advantages will become apparent from the following description made with reference to the drawings in which.

DESCRIPTION OF THE PREFERRED EMBODIMENT

Alumina-titanium carbide compositions were prepared by hot pressing. A composition with titanium carbide whiskers according to this invention and a comparative composition with equiaxed titanium carbide were prepared and tested for inherent properties and for suitability for machining. Suitability for machining was determined by fabricating tool inserts from the composite compositions and using the tool inserts under various machining conditions.

Figure 1:
FIG. 1 is a scanning electron photomicrograph of titanium carbide whiskers grown by the chemical vapor deposition process (magnification 5000X)
Figure 2:
FIG. 2 is a scanning electron photomicrograph of equiaxed titanium carbide particles used in commercially available ceramic tool materials (magnification 5000X)

A starting material for the preparation of the compositions according to this invention is titanium carbide whiskers powder. This powder was prepared in a chemical vapor deposition reactor. Several publications set forth methods of producing and harvesting titanium carbide whiskers including A. Kato et al. "Growth Rate of Titanium Carbide Whiskers in Chemical Vapor Deposition," *J. Cryst. Growth*, 37(1977) pp. 293-300; and N. Tamari et al. "Catalytic Effects of Various Metals and Refractory Oxides on the Growth of TiC Whiskers by Chemical Vapor Deposition," *J. Cryst. Growth* 46(1979) pp. 221-237. The titanium carbide whiskers are shown in FIG. 1 and may be compared to the equiaxed titanium carbide powder used in the comparative composition shown in FIG. 2.

EXAMPLE I

Mixes used in the preparation of two composite compositions are set forth in Table I.

TABLE 1

|  | Raw Material | Volume Percent |
|---|---|---|
| Mix No. 1 | Alumina | 69 |
|  | TiC Whiskers | 30 |
|  | Zirconia | 1 |
| Mix No. 2 | Alumina | 69 |
|  | TiC Equiaxed | 30 |
|  | Zirconia | 1 |

The alumina and zirconia were previously ground to an average size of 0.5 to 0.6 microns. The zirconia was added as a sintering aid. The raw materials were blended thoroughly. The blending of the TiC whiskers and the alumina powder should be done very gently but thoroughly. This will avoid excessive breaking of the whiskers and will provide a homogeneous distribution of the whiskers in the alumina matrix after sintering. One procedure for mixing the whiskers and alumina powder comprises preparing a slurry of alumina powder in alcohol or water in a ball mill, deagglomerating the whiskers in alcohol or water by the use of ultrasound, and mixing the alumina slurry and deagglomerated whiskers in a blender or ball mill. The resultant slurry is dried to prepare a powder for the subsequent forming steps. In the case of Mix No. 1 of this example, the whisker containing mixture was prepared generally as described and specifically the slurry of alumina powder and whiskers was mixed in a ball mill for one hour. Each mix was hot-pressed at two temperatures; namely, 1550 degrees Centigrade and 1500 degrees Centigrade at 4000 pounds per square inch pressure for sixty minutes under an Argon atmosphere. The hot pressed compositions were recovered and examined.

Figure 3:
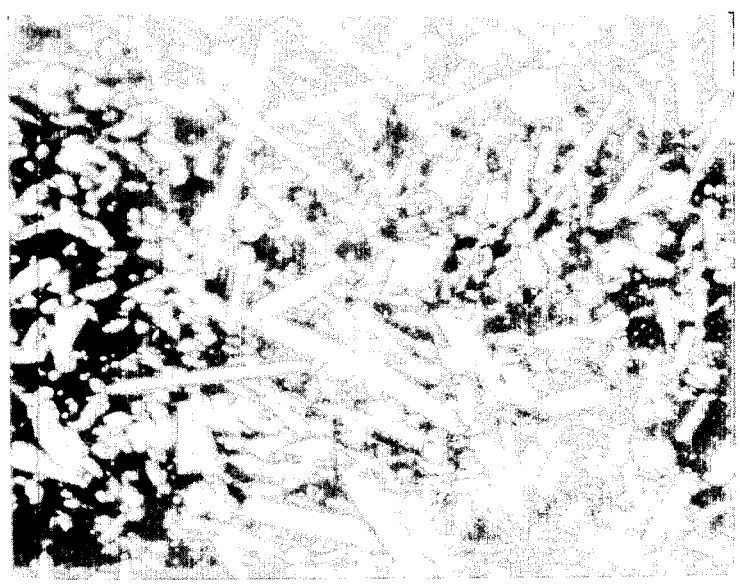
FIG. 3 is an optical micrograph of a polished section of a ceramic composition according to this invention showing an alumina matrix and imbedded titanium carbide whiskers (magnification 500X)
Figure 4:
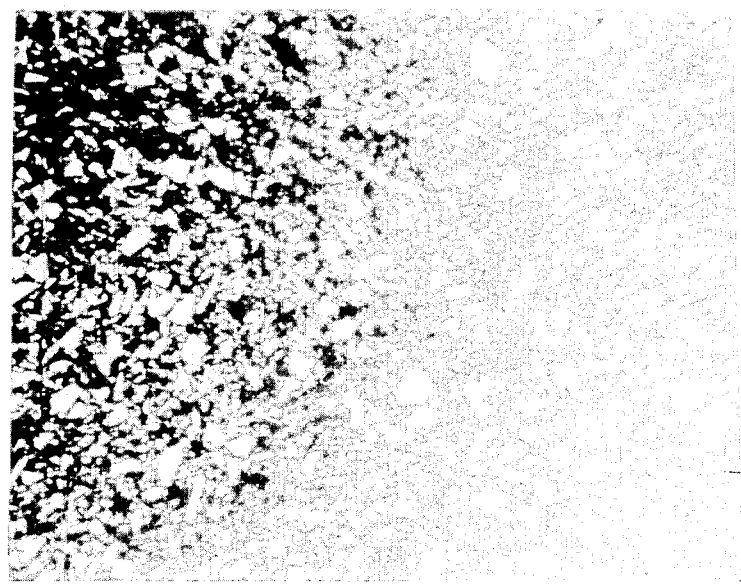
FIG. 4 is an optical micrograph of a polished section of a ceramic composition having two equiaxed phases (magnification 500X).

Optical micrographs of polished surfaces of the hot-pressed compositions are shown in FIGS. 3 and 4. It can be clearly seen that TiC particles (the white) have a whisker morphology in the composition prepared from Mix No. 1 and an equiaxed morphology in the composition prepared from Mix No. 2.

The physical and mechanical properties of both compositions were measured and are listed in Table 2 along with the properties of a commercial equiaxed alumina-titanium carbide composition being used for tool inserts. X-ray diffraction and fluorescence were used to further characterize the compositions.

TABLE 2

| | Comparative Data | | |
|---|---|---|---|
| Property | Mix No. 1 | Mix No. 2 | Commercial Product |
| Density (g/cc) | 4.253 | 4.265 | 4.290 |
| Vickers hardness VHN-18.5 kg (GPa): | 16.77 ± .31 | 18.51 ± .23 | 19.96 ± .29 |
| Fracture Toughness* $K_{1C}$18.5 kg (MPam$^{\frac{1}{2}}$): | 6.44 ± .49 | 5.00 ± .13 | 4.41 ± .22 |
| Diffraction: | (hot pressed at 1550° C.) $\alpha Al_2O_3$ TiC, monoclinic and tetragonal $ZrO_2$, $Ni_3Ti$ | (hot pressed at 1550° C.) $\alpha$-$Al_2O_3$ TiC, | $\alpha$-$Al_2O_3$ TiC. $MgAl_2O_4$ (Spinel) |
| Elements by X-Ray Fluorescence | Al, Ti, Ni, Fe, Zr | Al, Ti, Ni, W, Zr, Nb, Mo | Al, Ti, Mo |

*A. G. Evans and E. A. Charles "Fracture Toughness Determination by Indentation" J. Amer. Ceramic Soc. Vol. 59 No. 7-8, P. 731

The compositions were hot pressed to full density. The hardness of the whisker containing composite was somewhat lower than the equiaxed compositions but the toughness was much higher. Overall, the properties of the whisker containing composite were superior. Of course, the inherent properties of the compositions can only be used to predict performance of the compositions when used as machine tool inserts. Therefore, the machining tests were conducted.

Machining or metal cutting tests were conducted with inserts made from the hot-pressed compositions of mix Nos. 1 and 2. Hot pressed samples of each composition were diced and ground to SNG-434 style machine tool inserts (according to the published identification system developed by the American Standards Association). They were machine tested for both fracture resistance and wear resistance and compared to commercial equiaxed composite alumina-titanium carbide composition tool inserts and other comparative tool materials. The results of the tests are set forth in Table 3.

TABLE 3

| Tool Material | Tool Life (min) | Failure Mode |
|---|---|---|
| Cutting Conditions: Inconel 718 workpiece, 1000 sfm speed, 0.01 ipr feed, 0.1 inch doc. | | |
| Test A | | |
| Mix 1 | 2.4 | DOCN |
| Mix 1 | 2.9 | BK |
| Commercial (Al$_2$O$_3$ - TiC equiaxed) | 1.2 | BK |
| Mix 2 | 1.5 | BK |
| Commercial (Al$_2$O$_3$ - SiC Whiskers) | 5.7 | NW |
| Test B | | |
| Cutting Conditions: 4340 Steel WKPC, 1500 sfm speed, 0.01 inch feed, 0.1 inch d.o.c. | | |
| Mix 1 | 4.8 | FW |
| Mix 1 | 5.0 | BK |
| Commercial (Al$_2$O$_3$ - TiC equiaxed) | 4.5 | BK |
| Mix 2 | 6.3 | FW |
|  | 0.5 | BK |
| Al$_2$O$_3$ .20101% SiC Whiskers | 0.25 | BK |

WKPC=workpiece, sfm=surface feet per minute; ipr-=inches per revolution, d.o.c.=depth of cut, DOCN-=depth of cut notch failure; BK=broke, FW=flank wear failure.

Cutting test A and Inconel 718 was performed at a cutting speed of 1000 surface feet per minute (sfm) to test the fracture resistance of the tool inserts. Cutting test B with 4340 steel at a cutting speed of 1500 sfm was designed to compare wear resistance of the various materials.

As the results for Test A set forth in Table 3 show, the tool inserts made from the compositions according to this invention containing the titanium carbide whiskers (Mix 1) exhibited a longer life than tool inserts made from the comparative equiaxed compositions prepared from Mix No. 2 or the commercial product (Al$_2$O$_3$-TiC equiaxed). The failure modes for the tool inserts made from compositions according to this invention were "depth of cut notch wear failure" or "breakage". The failure mode for tool inserts made from both equiaxed compositions was breakage. A comparative tool insert containing silicon carbide whiskers in an alumina matrix has an even better tool life but can only beneficially be used with metals such as Inconel and not with steels. (See Test B.) Additional data gathered during Test A is not set forth in the table: At least every minute, machining was stopped to measure flank wear on the tool inserts. When flank wear vs. machining time for the tool inserts according to this invention containing the titanium carbide whiskers was compared with the tool inserts made with equiaxed titanium carbide, it was learned that the flank wear rate for both types of tool inserts was substantially identical.

The results of Test B as set forth in Table 3 indicate a slight advantage for the equiaxed titanium carbide phase compared to the titanium carbide whisker phase in applications where wear resistance is the most important property. However, the dismal performance of the tool inserts made from alumina-silicon carbide whisker materials is shown. The substantial advantage of the alumina titanium carbide whisker materials according to this invention is that it can be successfully used for cutting both carbon steel and superalloys such as Inconel.

EXAMPLE II

Compositions and tool inserts were prepared from three additional mixes similar to Mix 1. Mix 3 was prepared from 15 volume percent TiC whiskers, Mix 4 from 30 volume percent TiC whiskers and Mix 5 from 40 volume percent TiC wiskers. The remainder of both mixes was 1 volume percent ZrO$_2$ and the balance alumina. The same starting materials and manufacturing procedures were used except that hot pressing was only at 1550 degrees Centigrade. The fracture toughness data for compositions prepared from both are given in the following table.

TABLE 4

| Property | Mix 3 | Mix 4 | Mix 5 |
|---|---|---|---|
| Fracture Toughness K$_{1C}$ 18.5 kg (MPam$^{\frac{1}{2}}$) | 5.87 | 6.03 | 6.30 |

The data in Table 4 established that increasing the content of the titanium carbide whiskers from 15 to 40 results in an improvement in fracture toughness.

Having thus described the invention with the detail and particularity required by the Patent Laws, what is desired protected by Letters Patent is set forth in the following claims.

What we claim is:

1. A method of machining steels, cast iron, superalloys and the like comprising the steps of:
   (a) using a cutting tool insert comprised of sintered ceramic composition comprising 50 to 90 volume percent a polycrystalline alumina matrix having 10 to 50 volume percent single crystal titanium carbide whiskers distributed therein, and
   (b) maintaining the machining feed rate between 0.005 and 0.030 inch per revolution and the machining speed between 500 and 4000 surface feet per minute.

2. The method according to claim 1 wherein the depth of cut ranges up to 0.2 inch.

3. The method according to claim 1 wherein said cutting tool insert comprises up to 3 volume percent residue of sintering aids.

4. The method according to claim 3 wherein the high purity alumina of the cutting tool insert is comprised of at least 99 weight percent Al$_2$O$_3$ and the residue of sintering aids comprises up to 1 volume percent ZrO$_2$.

5. The method according to claim 3 wherein the average grain size of the high purity alumina matrix of the cutting tool insert is 0.5 to 3 microns and the diameter of the titanium carbide whiskers ranges from 0.25 to 3 microns and the length of the whiskers ranges up to 150 microns.

6. The method according to claim 1 wherein said cutting tool insert comprises
   (a) 65 to 85 volume percent high purity alumina,
   (b) 15 to 35 volume percent titanium carbide whiskers, and
   (c) up to 1.5 volume percent residue of sintering aids.

7. The method according to claim 1 wherein said cutting tool insert comprises
   (a) 75 to 85 volume percent high purity alumina,
   (b) 25 to 35 volume percent titanium carbide whiskers.

8. The method according to claim 3 wherein the whiskers in the cutting tool insert are randomly oriented.

9. The method according to claim 3 wherein the whiskers in the cutting tool insert are preferentially oriented in planes perpendicular to one axis.

10. A sintered ceramic composition comprising:
    50 to 90 volume percent of a polycrystalline alumina matrix; and
    about 10 to 50 volume percent of single crystal titanium carbide whiskers;
    wherein said titanium carbide whiskers are distributed in said polycrystalline alumina matrix.

11. A sintered ceramic cutting tool insert comprising:
    about 50 to 90 volume percent of a polycrystalline alumina matrix; and
    about 10 to 50 vol. percent of single crystal titanium carbide whiskers;
    wherein said titanium carbide whiskers are distributed in said polycrystalline alumina matrix.

* * * * *

UNITED STATES PATENT AND TRADEMARK OFFICE
CERTIFICATE OF CORRECTION

PATENT NO. : 4,925,458                                    Page 1 of 2
DATED      : May 15, 1990
INVENTOR(S) : Pankaj K. Mehrotra; Elizabeth R. Billman It is certified that error appears in the above—identified patent and that said Letters Patent is hereby corrected as shown below:

Title Page: column 1, after "[75] Inventors:" cancel "Pankaj K. Mehrotra, Greensburg; Elizabeth R. Billman, Pittsburgh, both of Pa." and substitute --Pankaj K. Mehrotra, Bernard North, both of Greensburg, Pa.; and Elizabeth R. Billman, Street, Md.--.

Column 4, Table 2, lines 59-63, the portion of the Table reading:

| Diffraction: | $\alpha Al_2O_3$ | $\alpha\text{-}Al_2O_3$ | $\alpha\text{-}Al_2O_3$ |
|---|---|---|---|
| | TiC, mono-clinic and | TiC, | TiC. |
| | tetragonal $ZrO_2$, $Ni_3Ti$ | | $MgAl_2O_4$ (Spinel) |

Should read:

| Phases by X-Ray Diffraction: | $\alpha\text{-}Al_2O_3$ | $\alpha\text{-}Al_2O_3$ | $\alpha\text{-}Al_2O_3$ |
|---|---|---|---|
| | TiC, mono-clinic and | TiC | TiC, $MgAl_2O_4$ (Spinel) |
| | tetragonal $ZrO_2$, $Ni_3Ti$ | | |

Column 5, Table 3, Test B, lines 40 and 41, the portion of the table reading:

| | 0.5 | BK |
|---|---|---|
| $Al_2O_3$ .20101% | 0.25 | BK |

Should read:

| $Al_2O_3$-20 vol.% SiC whiskers | 0.5 | BK |
|---|---|---|
| $Al_2O_3$-20 vol.% | 0.25 | BK |

UNITED STATES PATENT AND TRADEMARK OFFICE
CERTIFICATE OF CORRECTION

PATENT NO. : 4,925,458
DATED : May 15, 1990
INVENTOR(S) : Pankaj K. Mehrotra; Elizabeth R. Billman Page 2 of 2

It is certified that error appears in the above—identified patent and that said Letters Patent is hereby corrected as shown below:

Column 5, Table 3, Test B, lines 40 and 41, the portion of the table reading:

| | | |
|---|---|---|
| $Al_2O_3$ .20101% | 0.5 | BK |
| | 0.25 | BK |

Should read:

| | | |
|---|---|---|
| $Al_2O_3$-20 vol.% SiC whiskers | 0.5 | BK |
| $Al_2O_3$-20 vol.% SiC whiskers | 0.25 | BK |

Signed and Sealed this

Third Day of November, 1992

*Attest:*

DOUGLAS B. COMER

*Attesting Officer*     *Acting Commissioner of Patents and Trademarks*